United States Patent [19]

Kupper et al.

[11] Patent Number: 5,476,377
[45] Date of Patent: Dec. 19, 1995

[54] METHOD AND GRATE COOLER FOR HOT BULK MATERIAL

[75] Inventors: Detlev Kupper, Telgte; Gerhard Kästingschäfer, Wadersloh; Ludger Brentrup, Oelde, all of Germany

[73] Assignee: Krupp Polysius AG, Beckum, Germany

[21] Appl. No.: 303,882

[22] Filed: Sep. 9, 1994

Related U.S. Application Data

[63] Continuation of Ser. No. 18,881, Feb. 17, 1993, abandoned.

[30] Foreign Application Priority Data

Mar. 4, 1992 [DE] Germany .................. 42 06 837.1

[51] Int. Cl.⁶ .................................................. F27D 15/02
[52] U.S. Cl. .................................................. 432/78; 432/79
[58] Field of Search .................................... 432/77, 78, 79

[56] References Cited

U.S. PATENT DOCUMENTS

| | | | |
|---|---|---|---|
| 3,831,291 | 8/1974 | Kayatz | 432/77 |
| 4,349,969 | 9/1982 | Stewart et al. | 110/245 |
| 4,732,561 | 3/1988 | Eiring et al. | 432/78 |
| 5,205,227 | 4/1993 | Khinkis et al. | 110/245 |

*Primary Examiner*—Henry C. Yuen
*Attorney, Agent, or Firm*—Learman & McCulloch

[57] ABSTRACT

The invention relates to the cooling of hot bulk material, particularly cement clinker, ore material or the like, in a grate cooler, in which the bulk material is transported on the cooler grate surface toward an outlet and exposed to cooling gas from below. At least a part of the relatively cooler lower portion of the material layer is discharged through suitable chutes upstream of the cooler outlet while in transport to increase the cooling efficiency of the process.

24 Claims, 6 Drawing Sheets

METHOD AND GRATE COOLER FOR HOT BULK MATERIAL

This is a continuation of application Ser. No. 08/018,881 filed on Feb. 17, 1993, now abandoned.

The invention relates to a method of cooling hot bulk material, particularly cement clinker, ore material or the like as well as a grate cooler for the said hot bulk material.

BACKGROUND OF THE INVENTION

Cooling methods and grate coolers of this type are well known in the art in various embodiments.

From tests and observations on known grate coolers, for example for cooling cement clinker, it is known that in the case of these coolers which are used in practice the effective useful volume for bulk material to be cooled (e.g. cement clinker) reduces in the transport direction along the surface of the cooler grate. This means that a relatively large cooler grate surface is required, particularly in the zones which are to the rear in the transport direction on the after-cooling zones, in order to cool the bulk material sufficiently. This situation is briefly explained with the aid of FIG. 6 of the drawings, which have been kept quite schematic.

In FIG. 6, a grate cooler which is shown quite schematically at 1 has an inlet shaft 2 for hot bulk material (e.g. cement clinker) coming from a kiln and a cooler grate surface 3 which extends in the longitudinal direction of the cooler between a cooler inlet 1a and a cooler outlet 1b. Thus this cooler grate surface 3 forms a transport surface for bulk material 4 to be cooled, and—as is known per se—it has essentially alternating rows (cross-rows) 3a and 3b respectively of grate plates 5 and 6 which are respectively fixed and movable to and fro, are provided with gas openings and through which cooling gas or cooling air (cf. broken arrows 7) flow upwards from the bottom in cross-current.

If one considers the representation in FIG. 6, then it will be recognised that—as shown by layers of bulk material 4a and 4b which are left blank or hatched respectively— there is a reduction in the effective cooling volume in the bulk material transport direction (arrow 8); this reduction can counteract the principle of the rising bed height in the transport direction, at least in the so-called recuperative zone, if the grate cooler is constructed in the form of a step grate cooler—as is also generally known. By means of a rise in the bulk material bed height the effective cooling volume can then be kept approximately constant, but the overall bed height in the transport direction and accordingly also the pressure loss for the cooling air rises.

The situation is similar with other known constructions, of which U.S. Pat. No. 4,624,636 may be mentioned as an example. According to FIG. 1 of that document, the gas openings of the grate plates which form the cooler grate surface can clearly be so large that a certain quantity of fines of the bulk material to be called falls downwards through them, where it is collected from specially constructed compartments and removed, that is to say a certain screening of the fine material travelling along directly on the cooler grate surface out of the lowest layer of material can fall out downwards along the entire surface of the cooler grate, and a suitably accurate control of this quantity of fines which falls out downwards encounters difficulties.

The object of the invention, therefore, is to improve a method and a grate cooler in such a way that by relatively simple and readily controllable means a particularly intensive cooling effect can be achieved with comparatively low investment and operating costs.

Advantageous embodiments of the invention are the subject matter of the subordinate claims.

THE DRAWINGS

The invention will be explained below with the aid of the drawings, in which.

DETAILED DESCRIPTION

Figure 6:
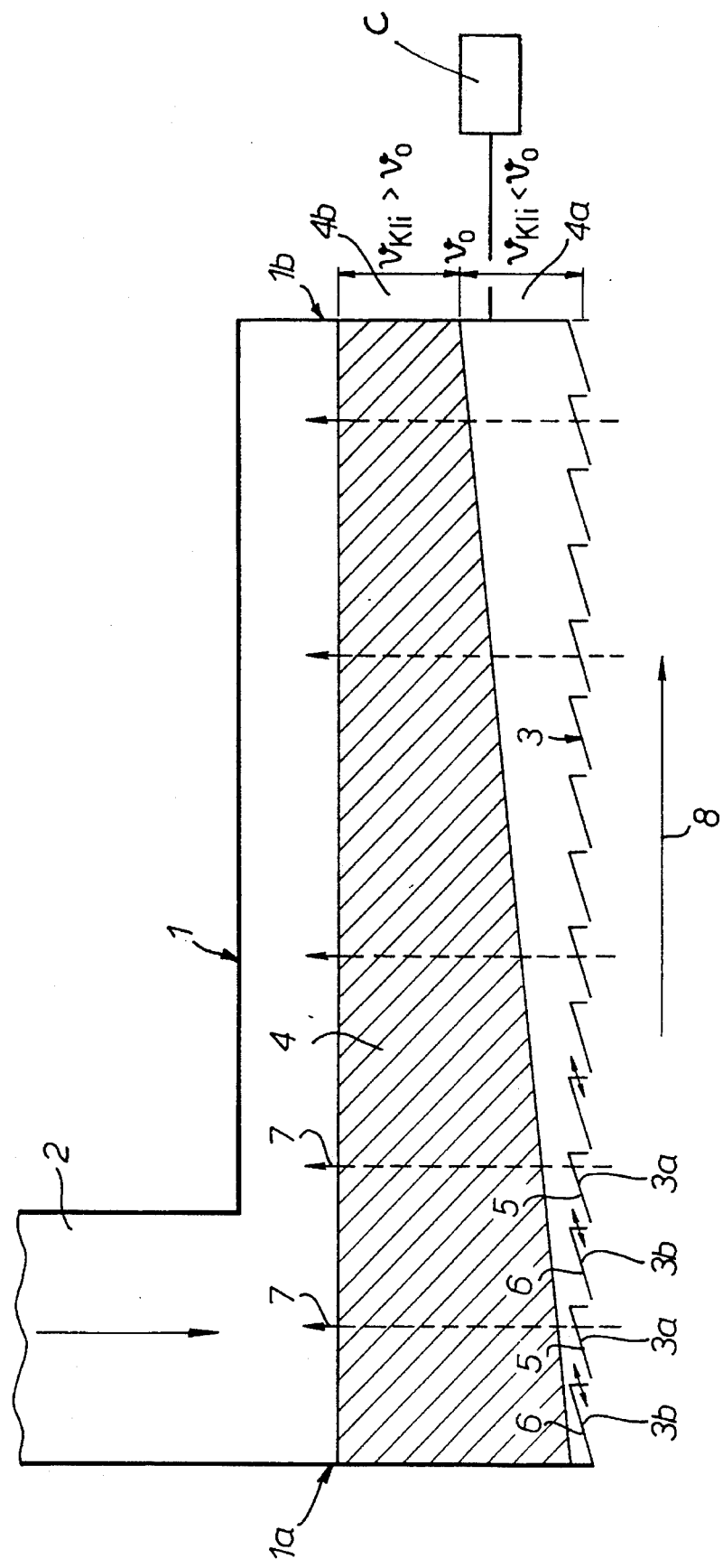
FIG. 6 shows a longitudinal sectional view through a general embodiment of a grate cooler in order to explain stratifications and temperature distributions in the bulk material bed, particularly in connection with the known prior art.

In order to explain the idea of the invention, reference will first of all be made again to FIG. 6, in which a so-called reciprocating grate cooler is shown as a (particularly preferred) example. This reciprocating grate cooler 1 is quite particularly adapted for cooling hot cement clinker, which in this case forms the bulk material 4 and is discharged through the inlet shaft 2 of a kiln which is not shown in greater detail and reaches the cooler grate surface 3 at the cooler inlet 1a. During the transport movement of the bulk material 4 to be cooled, a lower bulk material layer 4a which rises (becomes thicker) in the transport direction (arrow 8) and an upper bulk material layer 4b—shown hatched—which lies above it are formed in the bulk material bed in terms of the temperature distribution, if according to the arrows 7 cooling gas or cooling air is delivered from below and passed upwards through this bulk material bed in cross-current. If it is assumed that in the transition zone from the lower bulk material layer 4a to the upper bulk material layer 4b a temperature of $v_0$ prevails, then in the lower bulk material layer 4a a temperature $v_{Kli} < v_0$ prevails, whilst in the upper bulk material layer a temperature $v_{Kli} > v_0$ prevails. In the zone below the boundary temperature zone $v_0$, that is to say in the lower bulk material layer 4a, the bulk material 4 has already been sufficiently cooled in any case.

In recognition of these stratifications and temperature distributions in the transported bed of the bulk material (clinker) 4 to be cooled, according to the invention at least a part-quantity of bulk material is discharged downwards by gravity, above all from a lower part of the bulk material bed or of the bulk material layer 4a, before the cooler outlet as the bulk material to be cooled is being transported on the cooler grate surface. In the tests on which the invention is based it was, in fact, discovered that as a result of the stratification of the bulk material 4 to be cooled in the flow direction of the cooling gas (arrows 7), a temperature gradient occurs in the bulk material bed which has the effect that the lower bulk material layer which first comes into contact with the incoming cooling gas is the coolest, whilst the bulk material at the top of the bulk material bed at which the cooling gas again leaves the bulk material is the hottest. Thus according to the invention at least a proportion above all of the lower bulk material layer is discharged downwards by gravity before the cooler outlet 1b, so that hotter layers of bulk material which lie above it can sink downwards on the cooler grate surface 3. In this way bulk material which has already been sufficiently cooled no longer hinders the cooling of the hotter bulk material lying above it.

Figure 1:
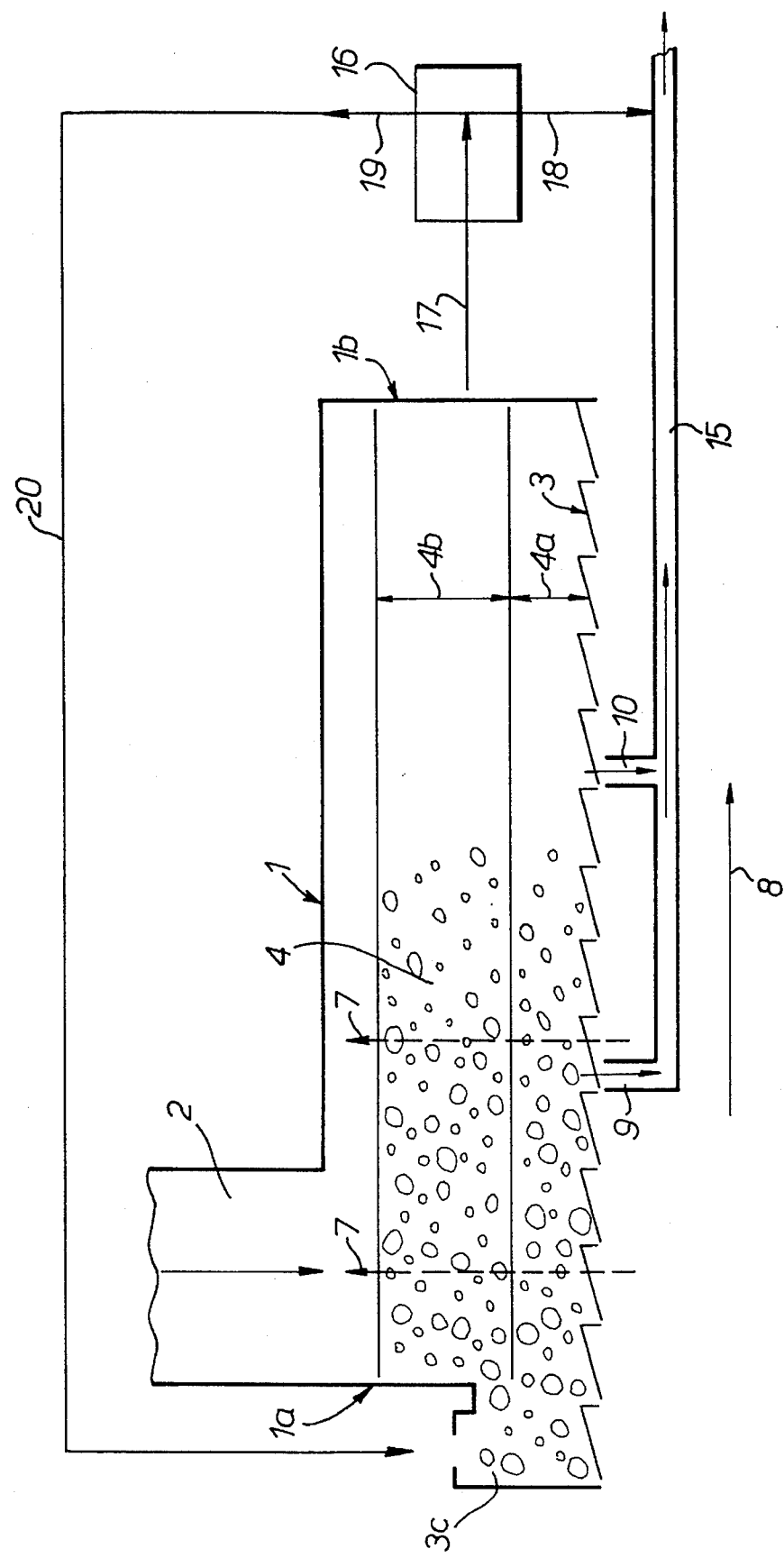
FIG. 1 shows a schematic longitudinal sectional view through a grate cooler according to the invention.

As shown in simplified form in FIG. 1, adjustable part-quantities of bulk material are preferably discharged downwards by gravity from the lower bulk material layer 4a at several points, namely at the discharge points 9 and 10 or at any number of discharge points over the length and/or breadth of the cooler grate surface 3. In this case it can also be advantageous for adjustable part-quantities of bulk material to be discharged downwards at specially selectable discharge points 9, 10. The part-quantities of bulk material discharged from the lower bulk material layer 4a can then be combined with the cooled bulk material running off at the cooler outlet 1b from the cooler grate surface 3, which will be explained in further detail below. At least the part-quantities of bulk material discharged from the lower bulk material layer 4a can be subjected to after-cooling. However, if required, the part-quantities of bulk material discharged from the lower bulk material layer 4a can also still be after-cooled together with the cooled bulk material running off at the cooler outlet 1b from the cooler grate surface 3 in a suitable cooling arrangement which is not shown here in detail.

In this case it may be advantageous to arrange a crusher C, preferably a roll rusher, at a suitable location at the cooler outlet 1b (as is known per se) to crush oversize particles at least of the quantities of the upper hot bulk material layer.

In this cooling method it is also advantageous if the quantity of material to be cooled remaining on the cooler grate surface 3 after the discharge of at least a part-quantity of bulk material from the lower bulk material layer 4a is set to a layer height which substantially corresponds to the layer height before the discharge point (9 or 10) of the part-quantities of bulk material. This can take place in a simple manner which is known per se, for example by corresponding reduction of the transport action of the grate plates 6 which are movable to and fro (whether by a somewhat altered plate height, or by a separate drive with a variable number of strokes) or by provision of a simple baffle or the like. In any case it is advantageous to construct a substantially constant bulk material bed height (and possibly also a bed height which reduces slightly towards the cooler outlet) over the entire length of the cooler grate surface which is effective for cooling.

On the basis of this procedure according to the invention a relatively high temperature gradient can be achieved between the bulk material to be cooled, particularly cement clinker, and the cooling gas flowing upwards from below through this bulk material, which leads to a particularly intensive and effective cooling of the hot bulk material. With the described method, this cooling can be achieved with a relatively low pressure loss. This favourable cooling effect then offers the further advantages that—by comparison with the known constructions—a smaller or shorter cooler grate surface is necessary with correspondingly lower investment and operating costs.

When this method according to the invention is carried out in practice, the part-quantities of bulk material are, of course, only discharged from the lower bulk material layer 4a after sufficient cooling. Viewed over the length of the cooler grate surface 3, this occurs approximately in the second half, preferably approximately from the beginning of the last third of the transport path on this cooler grate surface, but always depending upon the particular material to be cooled, the degree of cooling desired or already achieved, etc.

Before some further steps or variants of the method are dealt with, the embodiment of the grate cooler 1 shown in the drawings will be explained in somewhat greater detail.

As has already been explained above with the aid of FIG. 1, at least one discharge point for a part of the bulk material from the lower bulk material layer 4a is provided on the cooler grate surface 3 before or upstream from the cooler outlet 1b. Several such bulk material discharge points are preferably provided, of which only two are shown quite schematically in FIG. 1. These bulk material discharge points 9, 10 can—when viewed in the direction of transport (arrow 8) of the bulk material 4 to be cooled—can be constructed so that they are distributed, depending upon the particular requirements, over the length and/or breadth of the second half of the length of the cooler grate surface 3.

Figure 2:
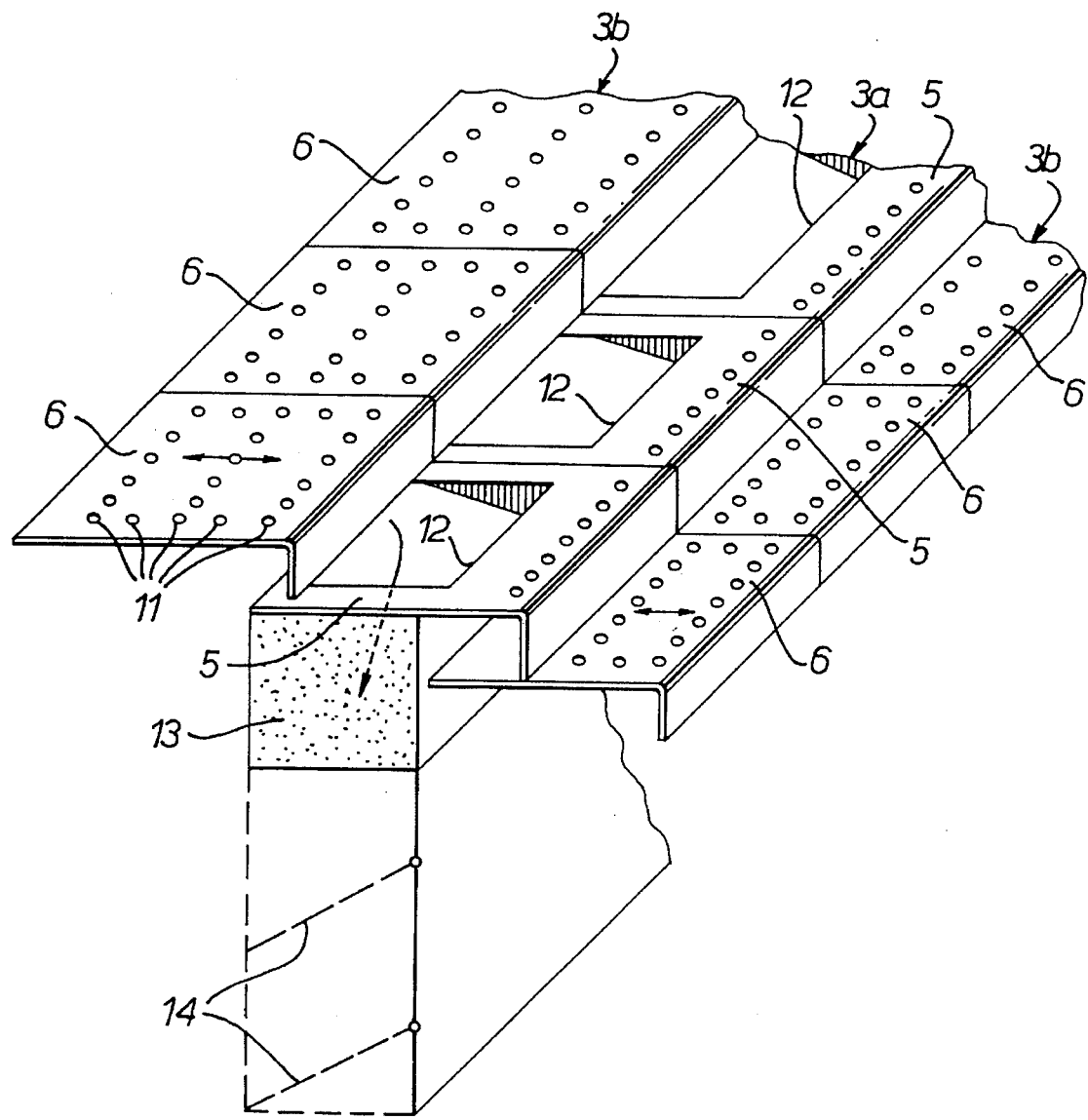
FIG. 2 shows a simplified perspective detail view of several rows of plates to illustrate a first embodiment of the construction of bulk material discharge points.

In practice these bulk material discharge points 9, 10 can be constructed in any suitable and advantageous manner as discharge and removal points for the part-quantities of bulk material to be discharged in each case. A first possibility is shown simply in FIG. 2. In FIG. 2 it is possible for the first time to see—more clearly than in FIG. 1—the more detailed construction and co-ordination of fixed grate plates 5 and reciprocating grate plates 6 in rows 3a and 3b respectively which alternate with one another. These grate plates 5, 6 can be provided in a manner which is known per se with gas openings 11 which are constructed and co-ordinated in a suitable manner so that a suitable cooling gas, particularly cooling air, can be delivered there from below so that it can flow in cross-current through the bulk material 4 to be cooled.

Bulk material discharge openings 12 which are sufficiently large are provided (see FIG. 2) in the upper plate surfaces of all or of selected fixed grate plates 5, and bulk material discharge shafts 13 are arranged below these openings. These bulk material discharge shafts 13 are provided with advantageous adjustment and valve arrangements in order to be able to discharge adjustable part-quantities of bulk material—as has been explained— downwards out of the lower bulk material layer 4a. In FIG. 2 double flap valves 14 are indicated quite schematically which are adjustable so that desired or adjustable part-quantities of the bulk material 4 can be discharged or removed through the bulk material discharge shafts 13 and thus also through the bulk material discharge openings 12.

Figure 3:
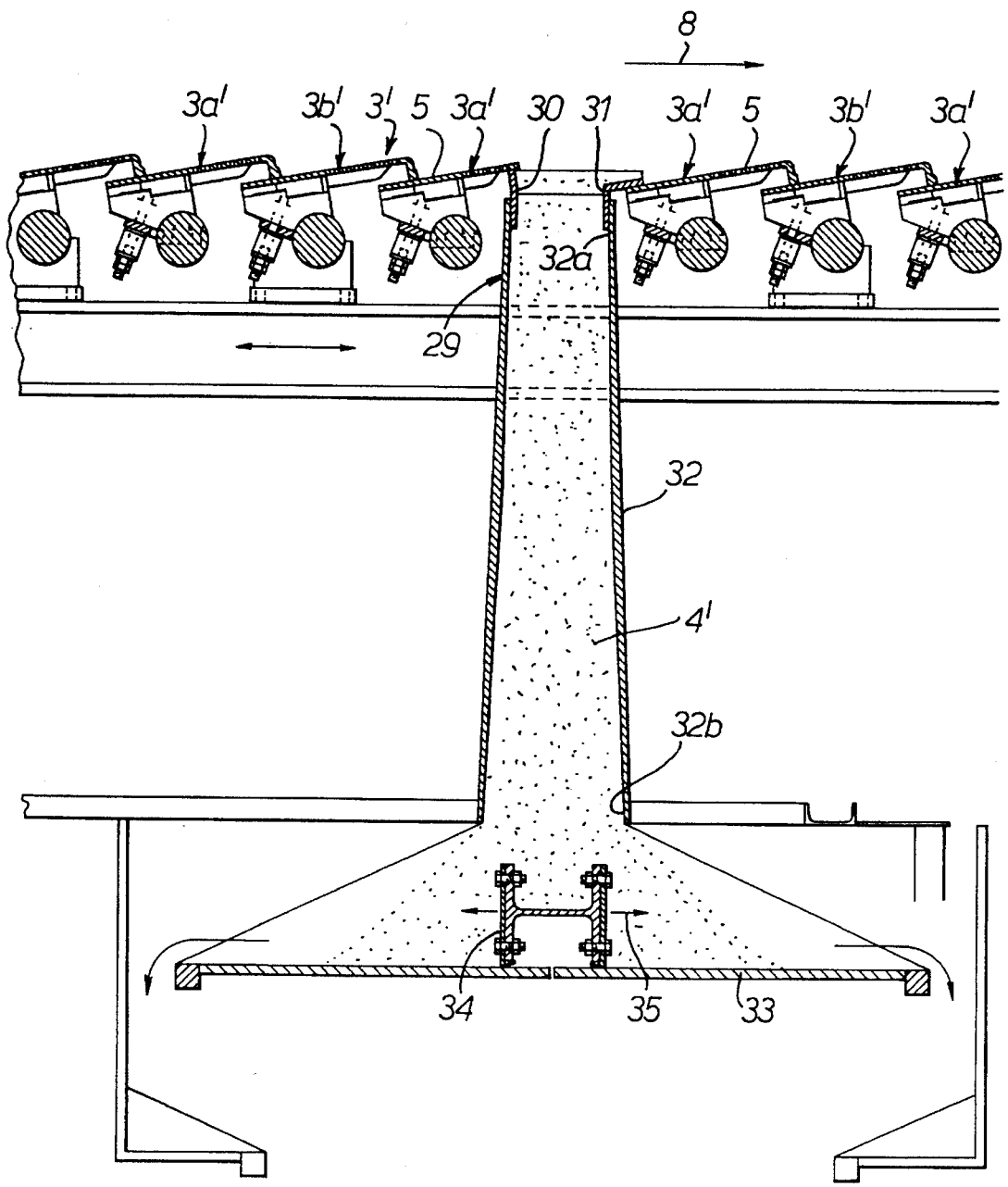
FIGS. 3, 4 and 5 show partial longitudinal sectional views through a grate cooler in order to show further embodiments of the arrangement and construction of bulk material discharge points.
Figure 4:
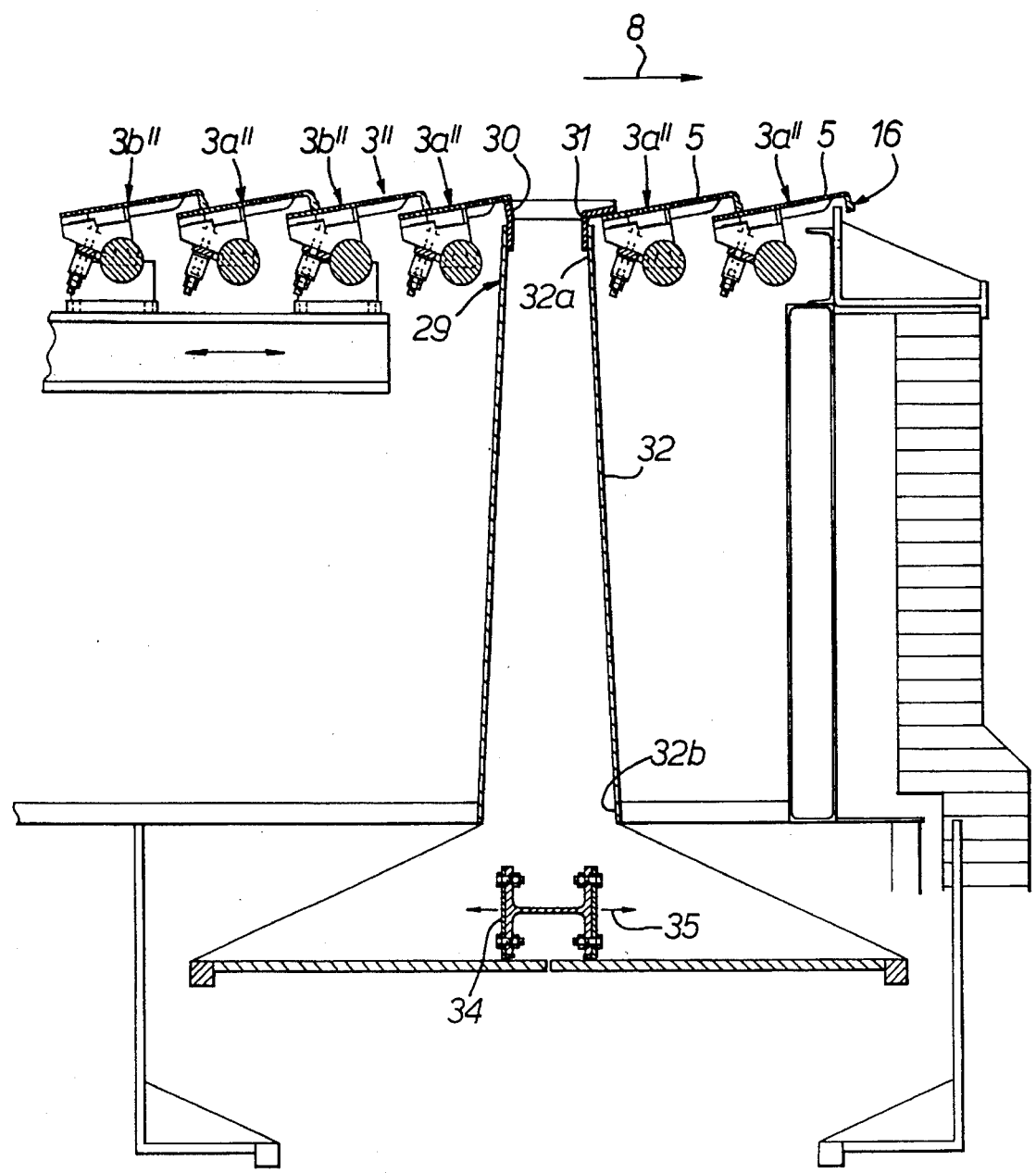
Figure 5:
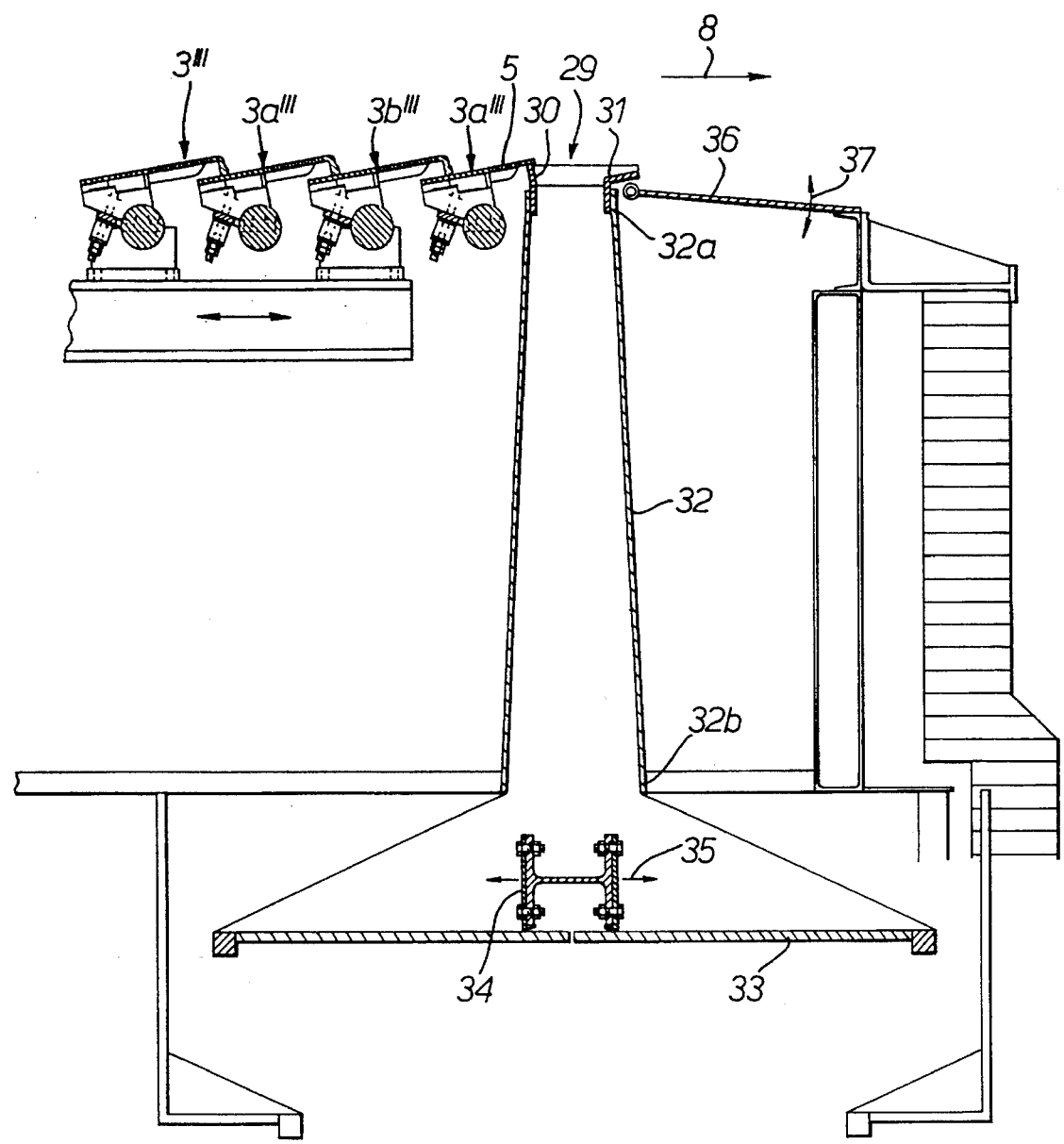

Further possibilities for the construction and arrangement of bulk material discharge points are illustrated in FIGS. 3, 4 and 5. Since in these three further embodiments the construction of the discharge points themselves can be the same in each case, this general construction will be described first of all.

In all three cases (FIGS. 3, 4 and 5) only one single bulk material discharge point 29 is shown for the sake of simplicity; naturally several such discharge points 29 can also be provided (according to the previous description with the aid of FIG. 1) along the length of the cooler grate surface 3', 3" or 3'" respectively. If one considers the bulk material discharge point 29 in these FIGS. 3, 4 and 5, then the first thing that is established is that at least between two successive fixed sections of the cooler grate surface 3', 3", 3'" (as will be discussed in greater detail below), each discharge point 29—viewed in the direction of transport (arrow 8) of the bulk material to be cooled—has a bulk material discharge opening 30 which extends transversely and is formed or defined by an upper opening frame of corresponding construction. Each transverse bulk material discharge opening 30 extends substantially over the entire width of the grate surface (perpendicular to the drawing planes of FIGS. 3, 4 and 5). In this case a discharge shaft 32 which is aligned approximately vertically downwards is arranged below the bulk material discharge opening 30 to discharge adjustable part-quantities of bulk material. This arrangement is—as FIGS. 3, 4 and 5 show—provided so that the completely open upper end 32a of each discharge shaft 32 is connected to the completely open opening frame 31, whilst the lower end 32b of the discharge shaft 32 opens with a clearance above a stationary bulk material distributor plate 33. This bulk material distributor plate 33 also extends transversely over the entire cooler grate surface 3', 3 or 3''' respectively, and its dimensions in the longitudinal direction of the cooler grate (as shown in this figure) are sufficiently large that the bulk material 4' located in the discharge shaft 32 can be supported and inclined on this distributor plate 33 without being able to run off by itself (under the effect of gravity) over the front or rear edge of this distributor plate 33 (cf. FIG. 3). To enable bulk material 4' discharged downwards in this discharge shaft 32 to flow off from the said bulk material distributor plate 33, a reclaiming beam 34 which is movable to and fro in the longitudinal direction of the cooler grate surface 3', 3" or 3''' respectively, i.e. in the direction of the double arrow 35, is arranged above this distributor plate in the region below the open end 32b of the discharge shaft and extending approximately parallel to the discharge shaft. This reciprocating movement to and fro (double arrow 35) can be produced with the aid of any suitable drive mechanism which is known per se (and therefore not shown in greater detail) in such a way that on the one hand this reciprocating movement can be switched on and off and on the other hand it is adjustable in size. The bulk material discharge point 29 can generally be activated by these measures, by switching its drive mechanism on or off, and its bulk material discharge or removable capacity can be adjusted in the manner desired in each case by the controllability of the reciprocating movement of the reclaiming beam.

The differences between the embodiments in FIGS. 3, 4 and 5—with the same construction of the bulk material discharge points 29—lie in the arrangement within the cooler grate surface 3', 3" or 3''' respectively.

If the embodiment according to FIG. 3 is considered in the light of the foregoing, then the bulk material discharge opening 30 and thus the opening frame 31 of the bulk material discharge point 29 is arranged between two successive fixed sections of the cooler grate surface which are formed by two rows 3a' of fixed grate plates 5. Accordingly these two rows 3' of grate plates are spaced from one another in the longitudinal direction of the cooler grate by such a distance that the opening frame 31 can be arranged between them in a suitable manner so that at this point a corresponding part-quantity of the bulk material to be cooled can be discharged downwards under the effect of gravity. Otherwise, movable rows 3b' of grate plates alternate with fixed rows 3a' in this cooler grate surface 3'.

FIG. 4 shows an example in which the bulk material discharge point 29 is arranged shortly before the cooler outlet 1b. In this case too the bulk material discharge opening 30 is again arranged between to fixed rows 3a" of grate plates in substantially the same way as in the example according to FIG. 3. However, in this example (FIG. 4) it is preferred for the row 3a" of grate plates which follows next in the bulk material transport direction (arrow 8) and thus— in this example—is the last row, also to be formed of fixed grate plates 5. Accordingly, in this cooler grate surface 3" the last three rows 3a"— viewed in the bulk material transport direction (arrow 8)— are formed of fixed grate plates 5, whilst the preceding rows of grate plates are again alternating rows 3a" and 3b" of fixed and movable plates respectively.

In the example according to FIG. 5 it may be assumed that the bulk material discharge opening 30 and thus its opening frame 31 is provided relatively shortly before the outlet end of the actual cooler grate surface 3'''. In this case— viewed in the bulk material transport direction (arrow 8 and with reference to the bulk material discharge opening 30—the front fixed section of the cooler grate surface 3''' is formed by a row 3a''' of fixed grate plates 5 and the rear fixed section of the cooler grate surface 3''' is formed by a material discharge chute or plate 36 which extends parallel to the rows 3a''' and 3b''' of grate plates and can be adjusted in is inclination according to the double arrow 37. This material discharge chute 36 which forms the rearmost part of the cooler grate surface 3''' leads to the advantage that the cooled bulk material to be discharged from the cooler grate surface 3''' can in any case slide down by itself particularly reliably and favourably under the effect of gravity. If required, this material discharge chute 36 can also be provided with cooling gas openings.

In all three embodiments described above (FIGS. 3, 4 and 5) the discharge shaft 32 of the bulk material discharge point 29 is always filled with material. The discharge of the bulk material then takes place in each case by corresponding activation of the reclaiming beam 34, the bulk material removal capacity of which—as described—is variable within wide limits, which results in a particularly reliable and favourably controllable removal capacity and means that the discharge shaft 32 is completely free of disruptive internal fittings.

It is also indicated schematically in FIG. 1 that at least one combined transport channel 15 is arranged below the cooler grate surface 3 so that the part-quantities of bulk material discharged at the discharge point 9, 10 can be combined and removed together. Any convenient conveyor arrangement can be used for this, such as for example a conveyor belt, a continuous-flow conveyor or the like.

As is also indicated schematically in FIG. 1, a material distribution device 16, which has a material feed channel 17 for bulk material running off at this cooler outlet 1b as well as two branch ducts 18, 19, can be advantageously provided behind the cooler outlet 1b. Of these two branch ducts, the first branch duct 18 leads to the aforementioned combined transport channel 15, whilst the second branch duct 19 is connected to a return conveyor 20—represented only symbolically by a line in FIG. 1—which is connected to the cooler inlet 1a before the delivery point for hot material. For this purpose the cooler grate surface 3 projects at least with a a recycled material inlet 3c somewhat below the inlet shaft 2 at the cooler inlet 1a, as indicated in FIG. 1.

As can be seen from the preceding description of the method steps (above), adjustable or selectable part-quantities of bulk material can be discharged from the lower bulk material layer 4a via the various discharge points 9, 10. In an extreme case it is even possible for the entire lower bulk material layer 4a to be discharged, so long as it is already sufficiently cooled, before it reaches the cooler outlet 1b. Depending upon the total size of the discharged part-quantities of bulk material a corresponding proportion of the bulk material 4 to be cooled remains behind on the cooler grate surface 3 and then leaves the cooler grate surface 3—as residual bulk material—at the cooler outlet 1b and, if required, passes—as is known per se— to a crusher for size reduction of oversize material.

By the provision of the material distribution device 16, the return conveyor 20 and the recycled material inlet 3c at the cooler inlet 1a, the further possibility advantageously presents itself that the residual bulk material leaving the cooler grate surface 3 at the cooler outlet 1b can be divided up so that one part-quantity is led through the branch duct 18 to the combined transport channel 15 and thus out of this cooling process, whilst a second selectable part-quantity is delivered via the branch duct 19, the return conveyor 20 and the inlet 3c for material to be cooled to the front end—when viewed in the transport direction (arrow 8)—of the cooler grate surface 3 before hot bulk material is discharged through the inlet shaft 2 onto this cooler grate surface. In this way a sort of "sandwich operation" is provided so that the recycled material delivered via the return conveyor 20 to the cooler grate surface 3 is distributed as the lowest bulk material layer on the cooler grate surface 3; then the hot bulk material coming from the kiln is placed or distributed on this lowest layer of bulk material as an upper layer. The bulk material returned from the cooler outlet 1b by the return conveyor 20 can preferably be branched off from the material layer 4b which is at the top—at the cooler outlet 1b—and thus can have a higher temperature than the bulk material which has already been cooled and is to be discharged. In this way the returned material which is still relatively warm can quickly be completely cooled as the base layer on the cooler grate surface 3 and thus at least partially as a new lower bulk material layer 4a. These measures contribute not only to an enhanced cooling effect but also protect the grate plates 5, 6 from a particularly high heating effect from the freshly delivered hot bulk material. Furthermore, in this way the degree of recuperation and thus the efficiency of the cooler in collaboration with an appertaining kiln can be considerably increased.

Depending upon the final temperature required or permitted for the bulk material to be cooled, a cooling operation is made possible which is free of or at least low in exhaust air.

We claim:

1. A method of cooling hot bulk material comprising delivering the hot material to a conveyor inlet to form a layer of said material of said conveyor; transporting said layer via said conveyor toward a primary outlet; passing a stream of cooling gas through said layer via openings in said conveyor and in a direction from one side of said layer to the other to establish in said layer a temperature gradient having its lowest value at said one side of said layer; reducing the thickness of said layer by diverting a portion of the material from said one side of said layer at least at one zone separate from and independent of said openings in said conveyor and located between said inlet and said primary outlet; accumulating the material diverted from said layer; adjusting the quantity of material diverted from the layer in inverse proportion to the quantity of accumulated material; and discharging the remainder of the material through said primary outlet.

2. The method according to claim 1 including returning a portion of the material discharged through said primary outlet to said inlet.

3. The method according to claim 1 including varying the quantity of the accumulated material.

4. The method according to claim 1 including diverting the material at said zone from said one side of said layer.

5. The method according to claim 4 wherein said one side of said layer is lowermost.

6. The method according to claim 1 including combining the material diverted at said zone with the material discharged through said primary outlet.

7. The method according to claim 1 including further cooling the diverted material.

8. The method according to claim 1 including maintaining a substantially uniform thickness of said layer between said zone and said primary outlet.

9. The method according to claim 1 including diverting a further portion of material from said layer at a second zone which also is separate from and independent of said openings in said conveyor, one of said zones being located at about one-half the length of said conveyor and the other of said zones being located at about two-thirds the length of said conveyor in the direction of transport of said layer.

10. A method of cooling hot bulk material comprising introducing said material to a conveyor via an inlet to form a layer of said material on said conveyor; transporting said material via said conveyor in a direction toward a primary outlet downstream of said inlet; cooling said material from below throughout its movement toward said primary outlet by passing a stream of cooling gas through openings in said conveyor and upwardly through said material, thereby producing in said material a temperature gradient having a relatively cooler bottom layer portion and a relatively hotter upper layer portion overlying said bottom layer portion; reducing the thickness of said layer by diverting a quantity of said relatively cooler bottom layer portion of said material from said conveyor at a zone downstream of said inlet and upstream of said primary outlet, said zone being separate from and independent of said openings; accumulating the diverted material; and adjusting the quantity of material diverted from said conveyor at said zone in inverse proportion to the quantity of the material collected.

11. The method according to claim 10 including collecting the diverted material in a chute having an inlet adjacent said conveyor and an outlet at a level lower than that of said conveyor.

12. The method according to claim 11 including accumulating the diverted material in said chute until said chute is filled and thereafter discharging controlled quantities of said diverted material from said chute and replacing said discharged accumulated material with additional relatively cooler material diverted from said conveyor.

13. Grate cooler apparatus for cooling hot bulk material comprising a conveyor having a material-supporting surface for transporting hot bulk material in a layer from an inlet at one end of said conveyor toward a primary outlet at its opposite end; a plurality of cooling gas openings extending along the length of said conveyor and underlying said supporting surface; means for directing cooling gas upwardly through said openings and through said layer of material as it is transported by said conveyor to establish in said layer a temperature gradient having its lowest temperature adjacent said supporting surface; at least one intermediate material outlet underlying and in communication with said supporting surface between said inlet and said primary outlet and separate from and independent of said cooling gas openings for enabling the diversion of a portion of said material through said intermediate outlet thereby reducing the thickness of said layer; means for accumulating the material discharged through said intermediate outlet; and adjustable means for discharging variable quantities of said accumulated material, the quantity of material diverted from said layer through said intermediate outlet being inversely proportional to the quantity of the accumulated material.

14. The apparatus according to claim 13 wherein said intermediate outlet is located at a distance at least half-way between said inlet and said primary outlet.

15. The apparatus according to claim 13 including a plurality of said intermediate outlets.

16. The apparatus according to claim 15 wherein said intermediate outlets are spaced across the breadth of said conveyor.

17. The apparatus according to claim 15 wherein said intermediate outlets are spaced along the length of conveyor.

18. The apparatus according to claim 15 wherein the means for accumulating the material discharged through said intermediate outlet comprises a chute below said conveyor in communication with said intermediate outlet for receiving the material discharged through said intermediate outlet.

19. The apparatus according to claim 18 wherein said chute includes flow control means for controlling the flow of material through said chute and thereby the quantity of material discharged through said chute.

20. The apparatus of claim 13 wherein said conveyor is a grate conveyor having a plurality of fixed grate plates and a plurality of reciprocating grate plates.

21. The apparatus according to claim 20 wherein at least some of said fixed grate plates are spaced in the direction of transport of said conveyor from adjacent others of said fixed grate plates, said intermediate outlet being positioned in the space between said adjacent fixed grate plates.

22. The apparatus according to claim 18 including flow control means having a stationary transverse distributor plate below the lower end of said chute for accumulating material from said chute, and a reciprocable reclaiming beam movable across said distribution plate for discharging controlled quantities of the accumulated material from the distributor plate.

23. The apparatus according to claim 13 including at least one transport channel below said conveyor and in communication with said accumulating means for receiving the material discharged from said accumulating means.

24. The apparatus according to claim 13 including a crusher in communication with said primary outlet for crushing at least a portion of the material discharged through said primary outlet.

* * * * *

UNITED STATES PATENT AND TRADEMARK OFFICE
CERTIFICATE OF CORRECTION

PATENT NO. : 5,476,377
DATED : December 19, 1995
INVENTOR(S) : Detlev Kupper et al.

It is certified that error appears in the above-indentified patent and that said Letters Patent is hereby corrected as shown below:

Column 2, cancel lines 2-3.

Column 9, line 9, change "15" to -- 13 --.

Signed and Sealed this

Nineteenth Day of March, 1996

Attest:

BRUCE LEHMAN

Attesting Officer           Commissioner of Patents and Trademarks